United States Patent [19]

Penaranda et al.

[11] Patent Number: 5,522,659
[45] Date of Patent: Jun. 4, 1996

[54] ELECTRICALLY OPERATED HAND MIXER WITH A WINDING ARRANGEMENT FOR A CONNECTING CABLE

[75] Inventors: Mariano Penaranda; Josep-Maria Masip, both of Barcelona; Robert Rafols, Sant Fost de Campcentelles; Jose Millan; Desideri Falco, both of Barcelona, all of Spain

[73] Assignee: Braun Aktiengesellschaft, Kronberg, Germany

[21] Appl. No.: 425,403

[22] Filed: Apr. 20, 1995

[30] Foreign Application Priority Data

Apr. 23, 1994 [DE] Germany .......................... 44 14 230.7

[51] Int. Cl.⁶ .................................................. A47J 43/07
[52] U.S. Cl. ............................ 366/129; 310/71; 403/95; 439/165
[58] Field of Search .................................... 366/129, 199, 366/206, 344; 403/95, 116; 310/50, 71; 439/31, 165, 446

[56] References Cited

U.S. PATENT DOCUMENTS

| | | | |
|---|---|---|---|
| 2,707,623 | 5/1955 | Schwaneke | 310/71 X |
| 5,366,187 | 11/1994 | Ishihara | 439/446 X |

FOREIGN PATENT DOCUMENTS

| | | |
|---|---|---|
| 262538 | 6/1968 | Austria . |
| 341410 | 11/1989 | European Pat. Off. . |
| 1837672 | 9/1961 | Germany . |
| 8232415 | 3/1983 | Germany . |
| 3815177 | 9/1989 | Germany .............................. 366/129 |
| 4119328 | 12/1995 | Germany .............................. 366/129 |
| 1522953 | 8/1978 | United Kingdom . |

*Primary Examiner*—Charles E. Cooley
*Attorney, Agent, or Firm*—Fish & Richardson

[57] ABSTRACT

An electrically operated hand mixer includes processing tools drivable by an electric motor for processing foods, and a housing accommodating the electric motor. A handle for manipulating the hand mixer is provided on the housing and extends substantially transversely to the longitudinal axis of the processing tools, wherein a connecting cable extends from the housing at the end remote from the processing tools and is swivellably guided in an antikink joint adapted to be swung from the housing. A winding-up arrangement is provided on the housing permitting winding the connecting cable onto the appliance. The antikink joint additionally serves as the winding-up arrangement in conjunction with a snap-in locking arrangement which, in a fixed position, along with the winding-up arrangement, permits guiding the connecting cable during the winding-up action. A reliable winding-up arrangement is achieved thereby in a simple manner.

10 Claims, 2 Drawing Sheets

ELECTRICALLY OPERATED HAND MIXER WITH A WINDING ARRANGEMENT FOR A CONNECTING CABLE

FIELD OF THE INVENTION

The invention relates to electrically operated hand mixers including processing tools.

BACKGROUND OF THE INVENTION

EP-B-0 341 410, for example, discloses a hand mixer of this type. In this appliance, the end of the handle is provided with an antikink joint, swivellable in the direction of the handle, which facilitates manipulating the hand mixer and, in addition, prevents bending of the cable which might lead to cable break after a long time. When the hand mixer is placed down on its bottom surface, another function of the antikink joint is that the cable can be swung out of the range of effect of the bottom surface, thereby ensuring unshaken placement of the hand mixer.

DE-U-82 32 415 discloses another electrically operated hand mixer, wherein a circumferential groove at the rear end of the appliance serves as a winding-up arrangement for the connecting cable. Creeping of the cable is easily possible though.

SUMMARY OF THE INVENTION

An electrically operated hand mixer including processing tools, such as whipping and kneading blades, drivable by an electric motor for processing foods, and a housing accommodating the electric motor, on which a handle for manipulating the hand mixer is provided and extends substantially transversely to the longitudinal axis of the processing tools, wherein a connecting cable extends from the housing at the end remote from the processing tools and is swivellably guided in all antikink joint adapted to be swung from the housing, and wherein a guiding arrangement is provided on the housing which permits winding the connecting cable onto the appliance, the antikink joint additionally serving as a winding-up arrangement which, in a fixed position, along with the winding-up arrangement permits guiding the connecting cable during the winding-up action.

An object of the present invention is to provide a hand mixer wherein ease of winding up the connecting cable by extremely straightforward means is achieved and wherein, subsequently, the so wound-up connecting cable reliably maintains its fixed position and will not slip off easily.

The fact that the connecting cable according to the present invention which extends from the housing and is guided by the antikink joint, is adapted to be fixed by the antikink joint in such a position as to be directed in the winding-up direction, renders it possible to wind the connecting cable particularly easily onto the appliance, thereby preventing it from creeping off the appliance again. To this end, both the groove and the projecting length of the antikink joint are required to be sized such that even especially long connecting cables are prevented from slipping off the housing. Arresting the cable in the winding-up position by way of a snap-in locking arrangement at the antikink joint, according to the present invention, prevents the antikink joint from swivelling back into its position of use after the winding-up action, the connecting cable remaining reliably wound onto the housing as a result. In the position of use, where the antikink joint may also extend substantially transversely to the plane of the winding-up arrangement, it may occur that the cable creeps from the appliance. A winding-up arrangement for a hand mixer, which can be put into effect and manipulated particularly easily, is achieved by the arrestability of the antikink joint. Instead of the groove, another guiding arrangement, such as a web, can be applied.

A particularly reliable seat of the cable on the hand mixer is achieved by the antikink joint extending substantially in parallel to the winding-up direction. However, defined inclined positions of the antikink joint in relation to the winding-up direction are also possible, due to which the retaining ability of the cable on the winding-up arrangement decreases, the more inclined the positions become.

A particularly advantageous aspect of the snap-in locking arrangement is achieved by the snap-in locking arrangement being allowed to move into its lock-in position only if this is desired by a user. Specifically, the snap-in locking arrangement is provided such that the force which is required to reach the locked position is in excess of the force which is exerted on the anti-kink joint by the movement of the connecting cable during operation of the hand mixer. This is because, to this end, major effort is needed by a user to move the antikink joint into its winding-up position for subsequently winding the connecting cable onto the winding-up arrangement. Resetting the antikink joint into its operating position, again, is possible only by increased expenditure of force. It is prevented that the cable resets automatically into the position of use when exposed to tensile strain and compressive load during operation of the hand mixer.

A particularly simple and reliable attachment of the connecting cable to the hand mixer is achieved by a sufficiently large diameter chosen for the winding-up arrangement. This, small bending radii of the cable, which would further automatic slipping of the connecting cable from the hand mixer, can be avoided to the greatest possible extent. According to the features of patent claim 6, manipulation is especially facilitated by the provision of the guiding arrangements for winding up the connecting cable on opposite places on the hand mixer.

A particularly straightforward snap-in locking arrangement, requiring no additional components, is achieved by the features of claim 7. Locking of the snap-in locking arrangement is obtained which is especially smooth in operation and reliably maintains the locking position nevertheless. The resiliency of both the pawl and the nose provides a durable and sturdy snap-in locking arrangement. Additional costs in the manufacture of the snap-in locking arrangement can be avoided by integrally forming the pawl and the housing of the anti-kink joint of plastic material.

An embodiment of the present invention is illustrated in the drawings and will be explained in detail in the following.

DESCRIPTION OF THE PREFERRED EMBODIMENTS

Figure 1:
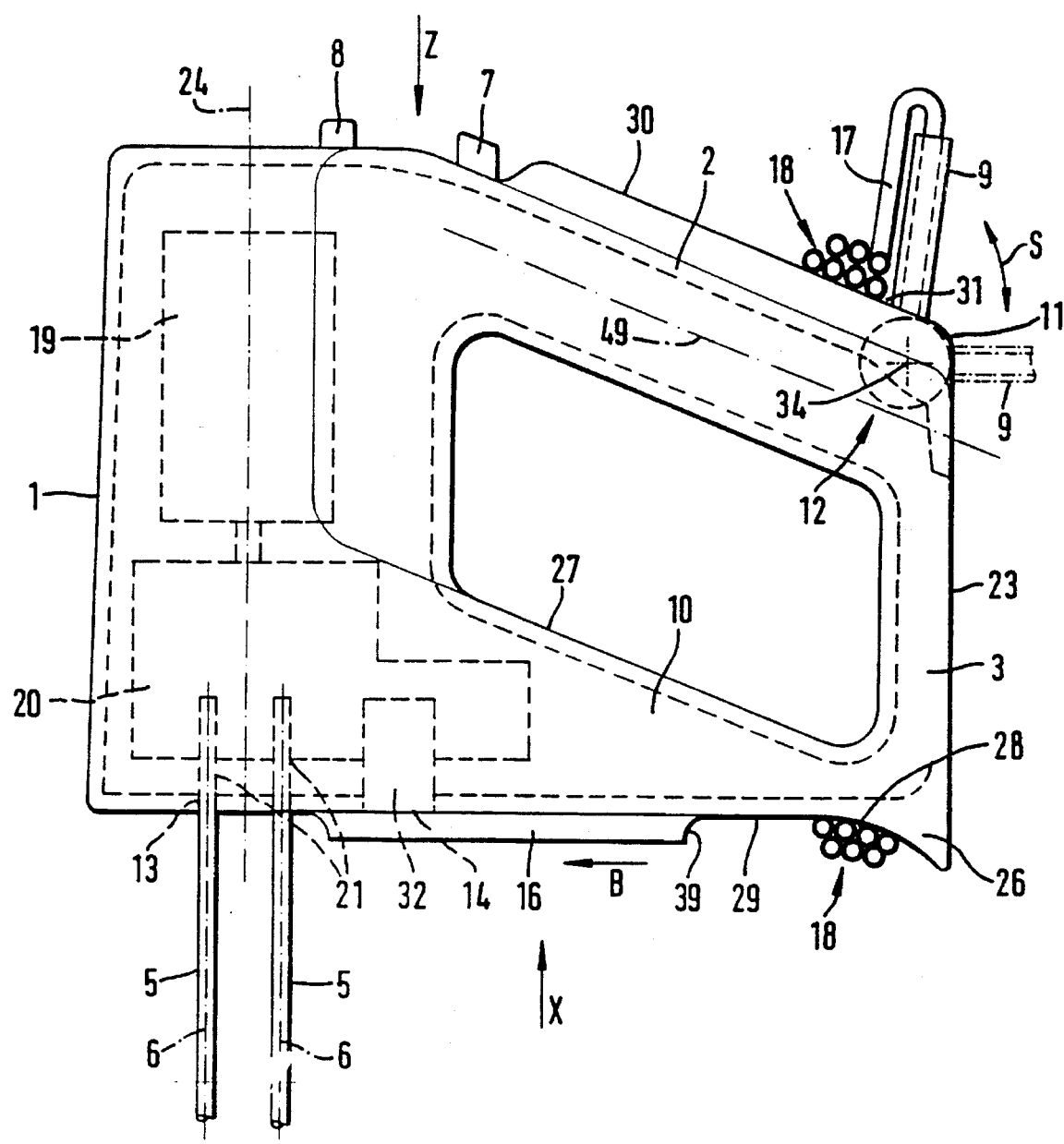
FIG. 1 is a lateral view of an electrically operated hand mixer with processing tools shown in part and with a connecting cable wound onto the appliance.
Figure 2:
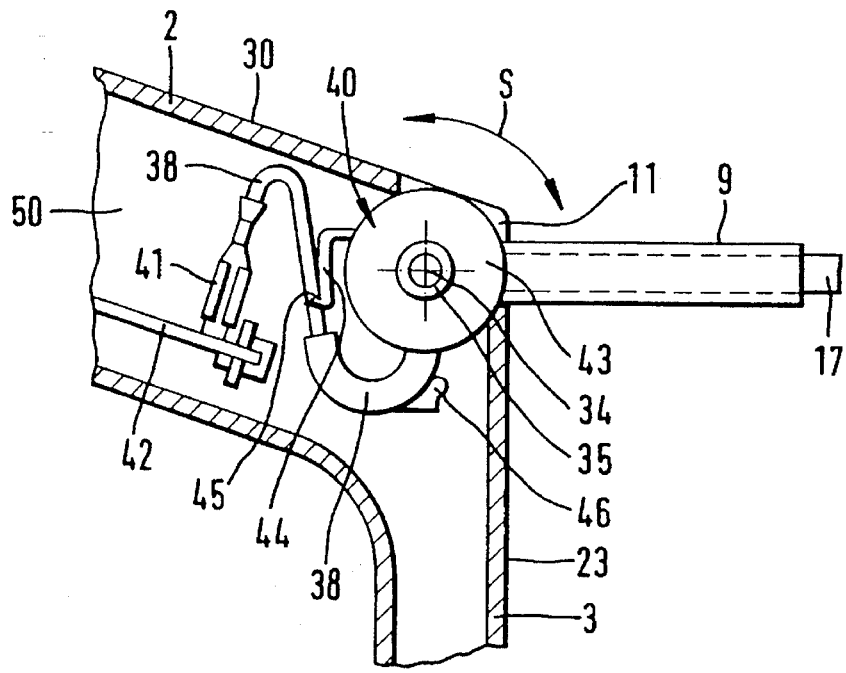
FIG. 2 is a partial cross-sectional view in the area of the antikink joint, the antikink joint being shown in the position of use of the hand mixer.
Figure 3:
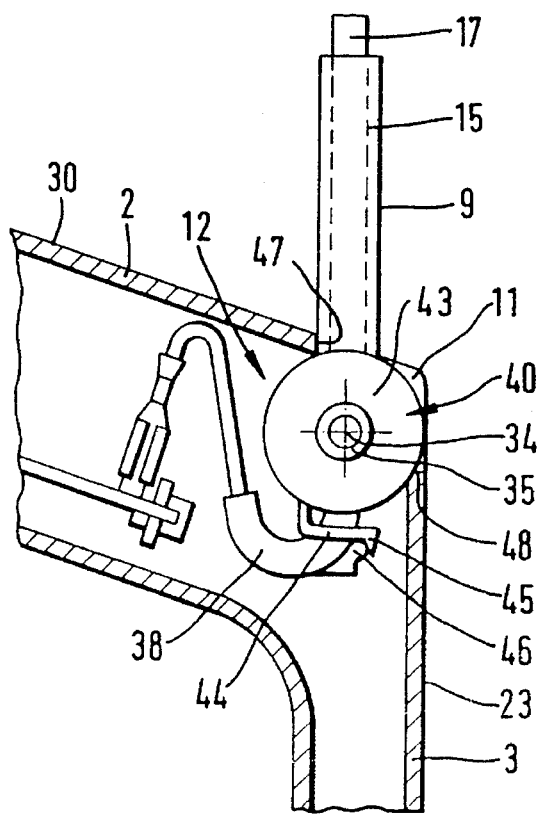
FIG. 3 is a partial cross-sectional view in the area of the antikink joint according to FIG. 1, wherein, however, the antikink joint has assumed the lock-in position for winding up.

To avoid repetitions, corresponding component parts in FIGS. 1 to 3 have been assigned like reference numerals.

FIG. 1 shows the hand mixer according to the present invention, serving to chop, knead and mix, etc. An elongated handle 2, which may be clasped conveniently by the hand, is shaped at the substantially cylindrical motor housing 1 in a transverse direction to the motor housing and with a downward inclination. The motor housing accommodates the electric motor 19 and the drive unit 20 to operate the various processing tools 5, for example, mixing, kneading and chopping attachments.

According to FIG. 1, a stepped switch 7, movable in a longitudinal direction, is provided at the top end of the handle 2. Projecting from the upper side of the motor housing 1 is an ejector button 8, on actuation of which the respective processing tool 5 is unlocked from its accommodation aperture 21 arranged on the gear unit 20, and drops out of the insertion hole 13 in the hand mixer. The insertion holes 13, 14, connected with the locking means (not shown), including their accommodation apertures 21, 32 for various processing tools 5 are provided on the gear unit 20 and extend outwardly, through the insertion holes 13, 14 placed at the bottom side of the housing 1. Thus, the processing tools 5 can be inserted from the outside through the insertion holes 13, 14 into the accommodation apertures 21, 32 of the gear unit 20. As can clearly be seen in FIG. 1, the motor 19 and the processing tools 5 extend in parallel on the same longitudinal axis 24 or 6, respectively, thereby obviating the need for complicated angular gears which would be necessary if motor 19 extended in a horizontal and not in a vertical direction. The gear unit 20 is arranged between the motor 19 and the processing tools 5 in the housing 1.

During a short off-time or also during operation, the hand mixer can be placed conveniently and safely with its bottom surface 23 on a working table (not shown) by way of an attachment element 3, in the shape of a web, formed at the free end of the handle 2 and extending in parallel to the longitudinal axis 24 of the appliance. Therefore, the bottom surface 23, remote from housing 1, of the attachment element 3, which is rounded upwardly and downwardly, is a surface for placing the handle in FIG. 1 and permits placing the hand mixer equipped with processing tools 5 such that the processing tools 5 do not get into contact with the working surface of the table but even extend in parallel to the working surface.

In FIG. 1, the hand mixer is enlarged by an arm 10 which connects the bottom area of the housing 1 with the attachment element 3. The arm 10, which extends substantially perpendicular to the housing 1 in a radially outward direction, in conjunction with the attachment element 3, the subsequent handle 2 and the housing 1, forms a homogeneous and stable plastic housing surface, with the laterally rounded arm 10, which is of flat shape on its upper and lower side (FIGS. 1 and 2), tapering from the motor housing 1 to the attachment element 3. Thus, the transition area from the housing 1 to the arm 10 is an enlarged portion 27 to position some of the parts of the gear unit 20.

The assembly unit of motor housing 1, attachment element 3, handle 2 and arm 10 forming a closed housing unit imparts increased stability to the hand mixer shown in FIG. 1. The illustrated unit is a plastic shell housing made of at least two parts, with the partition plane extending in parallel to the drawing plane. A space-saving direct-current motor serves as electric motor 19, the result is that the cross-section and the overall axial length of the motor housing 1 are substantially decreased (which is also due to the inclusion of the gear unit parts in the enlarged portion 27).

The plane bottom side 29 of the arm 10, which extends vertically to the bottom surface 23, includes a projecting tongue 16. The elongated tongue 16, rounded at both ends, is displaceable in opposition to the spring force B of a non-illustrated spring device so that, with the tongue 16 in its open position, the bore 14 is opened to receive a puréeing attachment (not shown) which is an additional processing tool.

For example, when a puréeing attachment is detached from the accommodation aperture 32 by actuation of the ejector button 8, the tongue 16 will automatically reset to the mentioned closed position, by the action of spring force B, and cover the insertion hole 14. This is especially important when using the other processing tools 5 (two kneading blades or two whipping blades) which are inserted into the insertion holes 13, arranged side by side in a conventional fashion in the front, round part of section 4, and are locked therein by way of the accommodation apertures 21. Thus, the insertion holes 13 serve for fixing two kneading blades, whipping blades, etc. Like the puréeing attachment, the processing tools 5 are detached by the ejector button 5.

In FIGS. 1 to 3, an opening 11 is provided at the end of the handle 2 remote from the motor housing 1, at the transition to the web 3, with a cylindrical portion 9 of an antikink joint 12 projecting from the opening. The cylindrical portion 9 forms an antikink spout for the connecting cable 17 which extends through the bore 15 of the cylindrical portion 9. According to FIG. 1, the connecting cable is wound around the winding-up arrangement 18 by way of single windings.

On the one hand, the winding-up arrangement 18 is composed of an enlarged portion 26 provided at the outer end of the lower arm 10, a sort of a groove 28 resulting in this area towards the motor housing 1. On the other hand, the cylindrical portion 9 of the antikink joint 12 in the upper area, with the upwardly directed peripheral surface 30, also forms part of the winding-up arrangement 18, a sort of a groove 31. Thereby, in the vertical position of the antikink joint 12 shown in FIG. 1, the grooves 28 and 31 jointly form a winding-up arrangement 18 in which the connecting cable 17 can easily be wound up and stored in a protected manner.

According to FIGS. 1 to 3, the antikink joint 12 has an axis of rotation 34, about which the antikink joint 12 can be swivelled in the direction of the arrow S. The axis of rotation 34 extends vertically into the drawing plane and, thus, is normal with the longitudinal axis 49 of the handle 2. The axis of rotation 34 is formed by pegs 35 which are arranged on the lateral surfaces of the antikink joint 12 and are guided in bearing lugs (not shown) provided on the inside of the handle 2.

As can be seen in FIGS. 2 and 3, the connecting cable 17 and its individual current conductors 38 extend radially out of the space provided between the two pegs 35 at the antikink joint 12 and are connected with a printed circuit board 42 at the inside 50 of the handle 2 by way of contact lugs 41. The pegs 35 are arranged on the side walls 43 of a tin-shaped housing 40, on which a pawl 44 is provided which partly extends in the circumferential direction of the housing 40.

The pawl 44 has an outwardly directed projection 45 which, according to FIG. 3, engages behind a nose 46 provided on the handle 2 in the winding-up position of the antikink joint 12. Thus, when the antikink joint 12 is moved counterclockwise in the direction of rotation S, according to FIG. 2, the pawl 44, when moved into upon abutment against the nose 46, will be deflected by tile nose in such a manner that, on continued rotation, the pawl will finally grip the nose 46 resiliently from behind (FIG. 3). The antikink joint 12 is unrotatably attached to the housing 1, and the connecting cable 17 can be wound onto the housing 1 according to FIG. 1.

During operation of the appliance, the antikink joint 12 can be swivelled clockwise in the direction of rotation S according to FIG. 2, after the connecting cable 17 has been unrolled from tile housing 1, with the pawl 44 and the nose 46, due to their resiliency, disengaging from their lock-in position so that, subsequently, the antikink joint 12 is freely movable about its axis of rotation 34, however, only to an extent until the cylindrical portion 9 abuts against the upper edge 47 or lower edge 48 of the handle 2 or the attachment element 3, respectively.

What is claimed is:

1. An electrically operated hand mixer for processing foods comprising:

a housing having a first end, a second end remote from the first end, and a handle which allows a user to manipulate the hand mixer, the housing accommodating an electric motor which drives processing tools at the first end of the housing, the handle extending substantially transversely to the longitudinal axis of the processing tools;

a connecting cable extending from the housing at the second end of the housing and swivellably guided in an antikink joint adapted to be swung from the housing, the antikink joint being swivellable between a winding-up position and an operating position;

a winding-up arrangement which allows the connecting cable to be wound on the hand mixer, the winding-up arrangement provided on the housing, with the antikink joint in the winding-up position serving as a guide to permit the connecting cable to be wound onto the hand mixer and to prevent the cable from sliding off the housing when wound on to the mixer; and a snap-in locking arrangement configured to fix the antikink joint in its winding-up position, the snap-in locking arrangement provided on the antikink joint and interacting with the housing.

2. A hand mixer as claimed in claim 1 wherein the winding-up arrangement for winding up the connecting cable onto the hand mixer forms a plane, and the antikink joint in the winding-up position extends substantially along the plane of the winding-up arrangement.

3. A hand mixer as claimed in claim 1 wherein the snap-in locking arrangement is provided such that the force which is required to swivel the antikink joint into the winding-up position is in excess of the force which is exerted on the antikink joint by the connecting cable during operation of the hand mixer.

4. A hand mixer as claimed in claim 3 wherein the handle is formed by an upper arm and a lower arm extending away from the housing, and the lower arm is provided with a groove and the upper arm is provided with the antikink joint.

5. A hand mixer as claimed in claim 4 wherein the groove and the antikink joint are provided on opposed surfaces of the lower and upper arms.

6. A hand mixer as claimed in claim 5 wherein, forming a bottom surface for placing the hand mixer on a flat surface, a free end of the upper arm and a free end of the lower arm are connected with a web which, along with the free ends of the upper and lower arms, forms the bottom surface.

7. A hand mixer as claimed in claim 6 characterized in that the snap-in locking arrangement is formed wherein a housing of the antikink joint has an axis of rotation which is swivellable transversely to the longitudinal axis of the handle, and is penetrated by the connecting cable extending through a bore, and wherein the snap-in locking arrangement comprises a resilient pawl provided on the housing of the antikink joint and, when the antikink joint is in the winding-up position, the pawl lockingly engages a nose provided on the handle.

8. A hand mixer as claimed in claim 7 wherein the pawl extends in the swivelling direction of the antikink joint and the nose is formed of a peg provided on the handle.

9. A hand mixer as claimed in claim 8 wherein the pawl and the housing of the antikink joint are integrally formed of plastic material.

10. The hand mixer of claim 1 wherein a portion of the outer surface of the antikink joint external to the housing contacts the cable to prevent the cable from sliding off the hand mixer in the winding-up position.

* * * * *

UNITED STATES PATENT AND TRADEMARK OFFICE
CERTIFICATE OF CORRECTION

PATENT NO. : 5,522,659
DATED : June 4, 1996
INVENTOR(S) : Penaranda, et al.

It is certified that error appears in the above-indentified patent and that said Letters Patent is hereby corrected as shown below:

Col. 1, line 48, delete "so"

Col. 2, line 32, replace "this" with --thus--

Col. 5, line 7, replace "tile" with --the--

Signed and Sealed this

Eighth Day of July, 1997

Attest:

BRUCE LEHMAN

Attesting Officer

Commissioner of Patents and Trademarks